(12) United States Patent
Zhang et al.

(10) Patent No.: US 7,663,880 B2
(45) Date of Patent: Feb. 16, 2010

(54) HOLDER FOR EXTERNAL KEYPAD FOR PORTABLE ELECTRONIC DEVICE

(75) Inventors: Xu-Ri Zhang, Shenzhen (CN); Ye Liu, Shenzhen (CN); Rui-Hao Chen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 151 days.

(21) Appl. No.: 11/964,862

(22) Filed: Dec. 27, 2007

(65) Prior Publication Data

US 2009/0103254 A1    Apr. 23, 2009

(51) Int. Cl.
G06F 1/16 (2006.01)

(52) U.S. Cl. .............................. 361/679.56; 455/550.1; 400/279; 705/79; 341/32

(58) Field of Classification Search ................... 341/22, 341/32; 335/207; 200/521; 455/550.1, 556.2; 705/39, 79; 400/279, 706, 582; 84/688; 345/1.1, 168; 361/679.56, 679.09, 679.11, 361/679.12, 679.13, 679.14, 679.17
See application file for complete search history.

(56) References Cited

U.S. PATENT DOCUMENTS

| | | | |
|---|---|---|---|
| 3,638,221 A | * | 1/1972 | Bernin ...................... 341/32 |
| 5,057,807 A | * | 10/1991 | Longly et al. ............... 335/207 |
| 2008/0264770 A1 | * | 10/2008 | Purcocks .................... 200/521 |
| 2009/0102684 A1 | * | 4/2009 | Zhang et al. .................. 341/22 |

* cited by examiner

Primary Examiner—Hung V Duong
(74) Attorney, Agent, or Firm—Steven M. Reiss

(57) ABSTRACT

A holder (35) includes a base (33), an orientation block (36), a located block (37) and two magnets (38, 39). The base includes a mounting portion (40) and a securing portion (50). The orientation block is fixed in the mounting portion. The located block is slidably engaged in the securing portion. One of the magnets is disposed adjacent to the securing portion, the other of the magnets is disposed in the located block. The magnets are attracted to each other and configured for adjusting a distance between the orientation block and the located block.

20 Claims, 8 Drawing Sheets

HOLDER FOR EXTERNAL KEYPAD FOR PORTABLE ELECTRONIC DEVICE

BACKGROUND OF THE INVENTION

1. Field of the Invention

The present invention relates to holders, and, particularly, to a holder for an external keypad for portable electronic devices.

2. Discussion of the Related Art

With the development of wireless communication and information processing technologies, portable electronic devices are ubiquitous. Consequently, add-ons or accessories for these devices are widespread. One such accessory is an external keypad. The need for external keypads is because the on-board keypad may be too small or may not have the desired function keys of the user.

Although an external keypad may greatly improve the information input speed, a conventional external keypad does not provide a holder used for fixing the external keypad to the portable electronic device. In use, the external keypad is only placed on the portable electronic device, and is not be fixed. Therefore, when the external keypad is operated by hands, a uniform force is easy to be applied to the external keypad. Accordingly, the external keypad is easy to be fall off from the portable electronic device.

Therefore, a new holder that is able to fix an external keypad to a portable electronic device is desired.

SUMMARY OF THE INVENTION

One embodiment of the holder includes a base, an orientation block, a located block and two sets of magnets. The base has a mounting portion and a securing portion. The orientation block is fixed in the mounting portion. The located block is slidably engaged in the securing portion. One set of the magnets is disposed adjacent to the securing portion, the other set of the magnets is disposed in the located block. Each set magnets are attracted to each other and is configured for adjusting a distance between the orientation block and the located block.

Other advantages and novel features of the present holder will become more apparent from the following detailed description thereof when taken in conjunction with the accompanying drawings.

BRIEF DESCRIPTION OF THE DRAWINGS

Many aspects of the holder can be better understood with reference to the following drawings. The components in the drawings are not necessarily drawn to scale, the emphasis instead being placed upon clearly illustrating the principles of the present holder. Moreover, in the drawings, like reference numerals designate corresponding parts throughout the several views, in which.

DETAILED DESCRIPTION OF THE INVENTION

Figure 1:
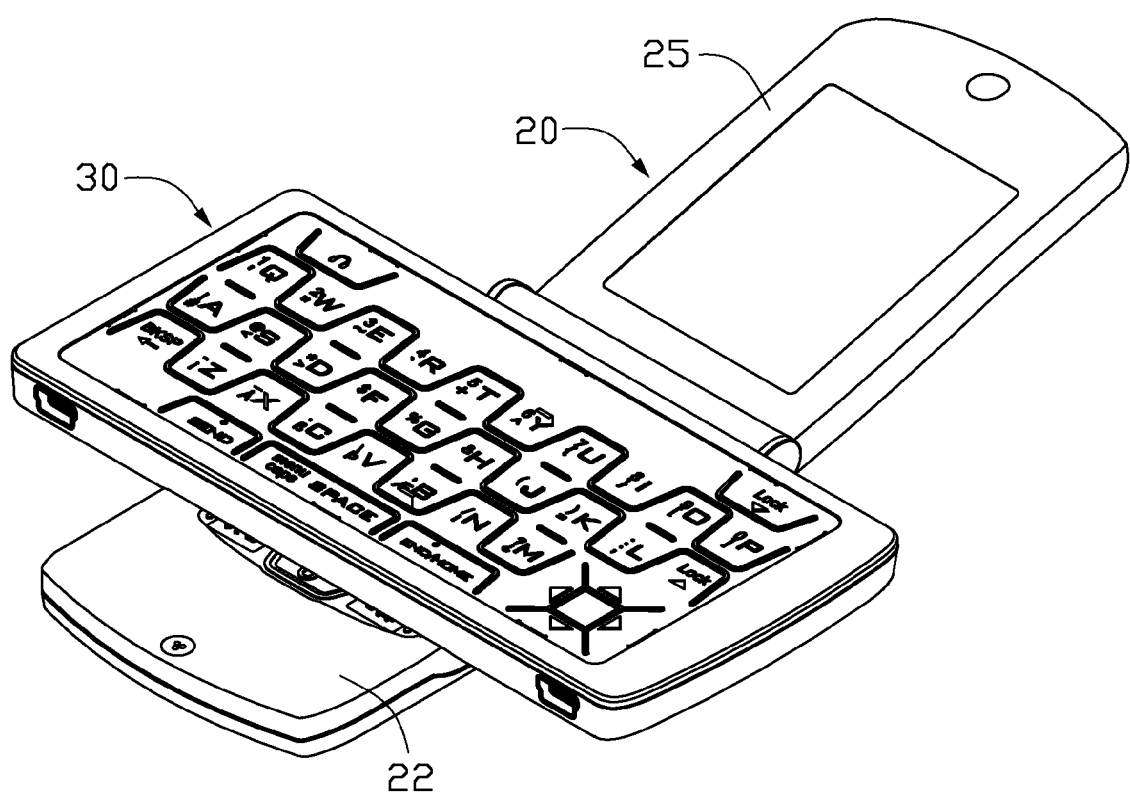
FIG. 1 is an isometric view of a portable electronic device with an external keypad.

The present holder, in one illustrated embodiment, is disposed on an external keypad configured for clamping the external keypad to a portable electronic device such as a mobile phone, personal digital assistant (PDA) and so on. Understandably, the holder may be advantageously used for other situations. Referring to FIG. 1, an external keypad 30 is connected to a mobile phone 20. The mobile phone 20 includes a body section 22 and a cover section 25 which are rotatably interconnected with a hinge.

The external keypad 30 is a qwerty keyboard, which is similar to a keyboard of a computer. The external keypad 30 may be placed on the body section 22 of the portable electronic device. The user may operate the external keypad 30 in both hands so as to realize the operation for the mobile phone 20, thereby greatly improving the text-message input speed.

Figure 2:
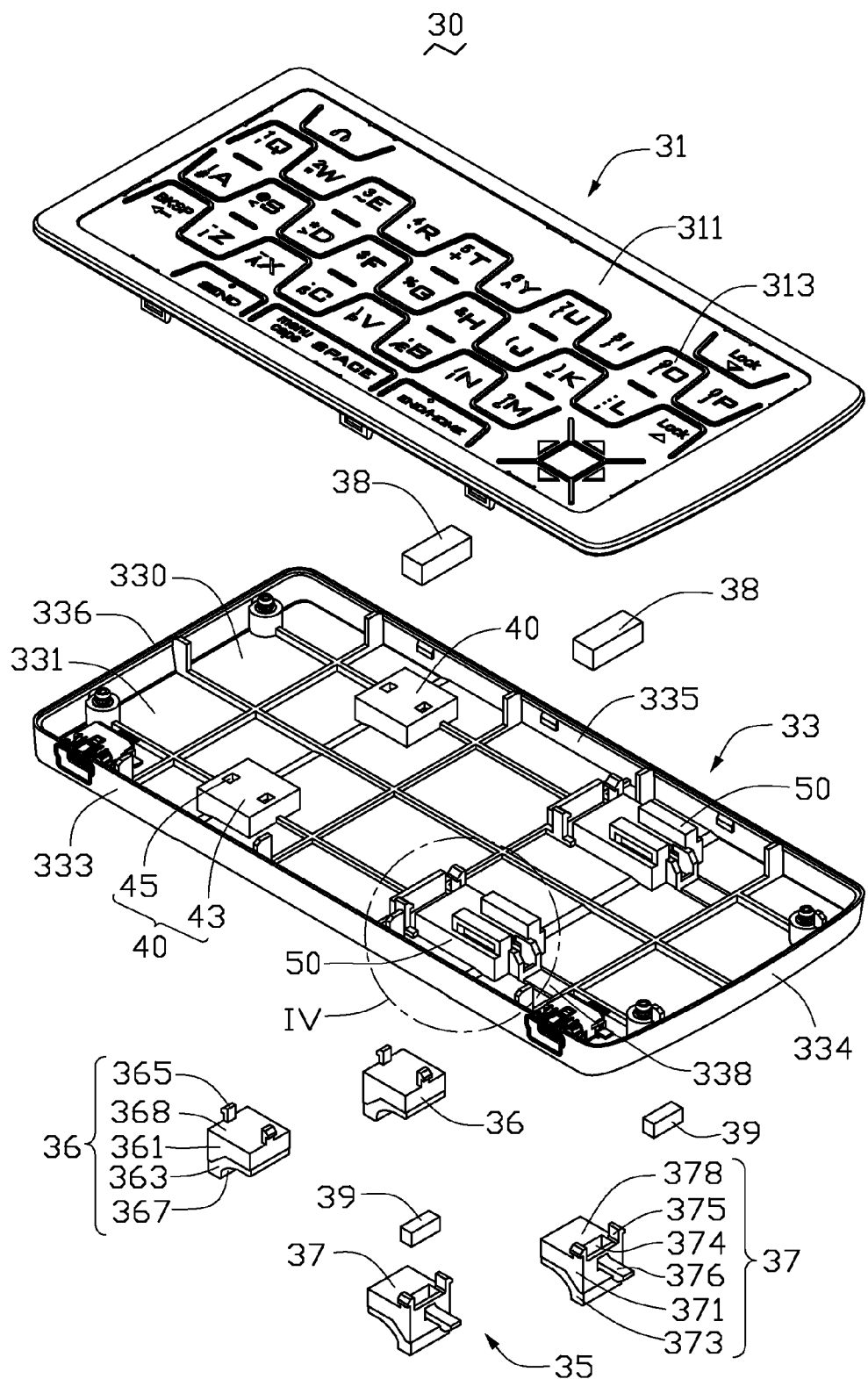
FIG. 2 is an exploded, isometric view of one embodiment of the external keypad with a holder shown in FIG. 1.
Figure 3:
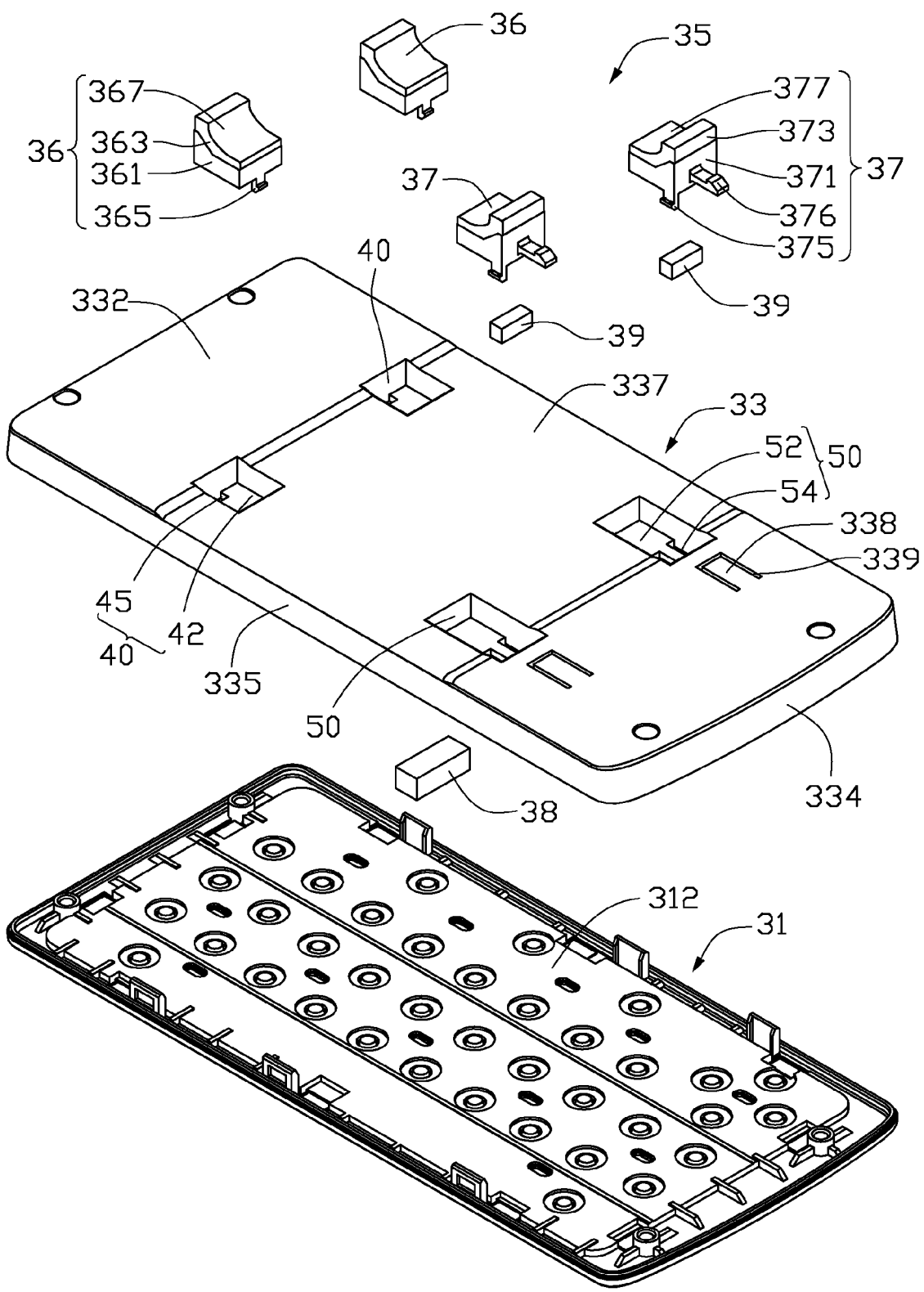
FIG. 3 is similar to FIG. 2, but viewed from another aspect.

Referring to FIGS. 2 and 3, the external keypad 30 includes a key module 31, a base 33 and a holder 35. The key module 31 may be assembled into the base 33, and the holder 35 may be attached to the base 33. The key module 31 is substantially rectangular, and includes a first surface 311 and a second surface 312 opposite to each other. The first surface 311 of the key module 31 includes a plurality of keys 313 thereon.

The base 33 is substantially rectangular configured for matching the shape of the key module 31 so that the base 33 and the key module 31 may be assembled together. The base 33 includes an inner surface 331 and an outer surface 332. The base 33 perpendicularly extends a first sidewall 333, a second sidewall 334, a third sidewall 335 and a fourth sidewall 336 along four edges of the inner surface 331. The first sidewall 333 is parallel to the third sidewall 335. The second sidewall 334 is parallel to the fourth sidewall 336. The first sidewall 333, the second sidewall 334, the third sidewall 335 and the fourth sidewall 336 with the inner surface 331 cooperatively define a cavity 330. The outer surface 332 has a recessed portion 337 formed in a middle area thereof. A width of the recessed portion 337 is larger than that of the body 22 of the mobile phone 20, so as to receive the body 22 of the mobile phone 20.

The holder 35 includes two mounting portions 40, two securing portions 50, two orientation blocks 36, two located blocks 37, a first set magnets 38 and a second set magnets 39. Each set includes two magnets.

The two mounting portions 40 are disposed in an edge of the recessed portion 337 toward the fourth sidewall 336. The securing portions 50 are disposed in an opposite edge of the recess portion 337 toward the second sidewall 334. The mounting portions 40 are parallel to the securing portions 50.

The mounting portions 40 intersects the inner surface 331 and the outer surface 332 of the base 33. Each mounting portion 40 defines a receiving groove 42 at the side of the outer surface 332, and forms a protrusion block 43 at the side of the inner surface 331. The protrusion block 43 extends from the inner surface 331, and has two symmetrical holes 45 defined therein. Each hole 45 communicates with the receiving groove 42. A central line of the holes 45 is parallel to the first sidewall 333 and the third sidewall 336.

Figure 4:
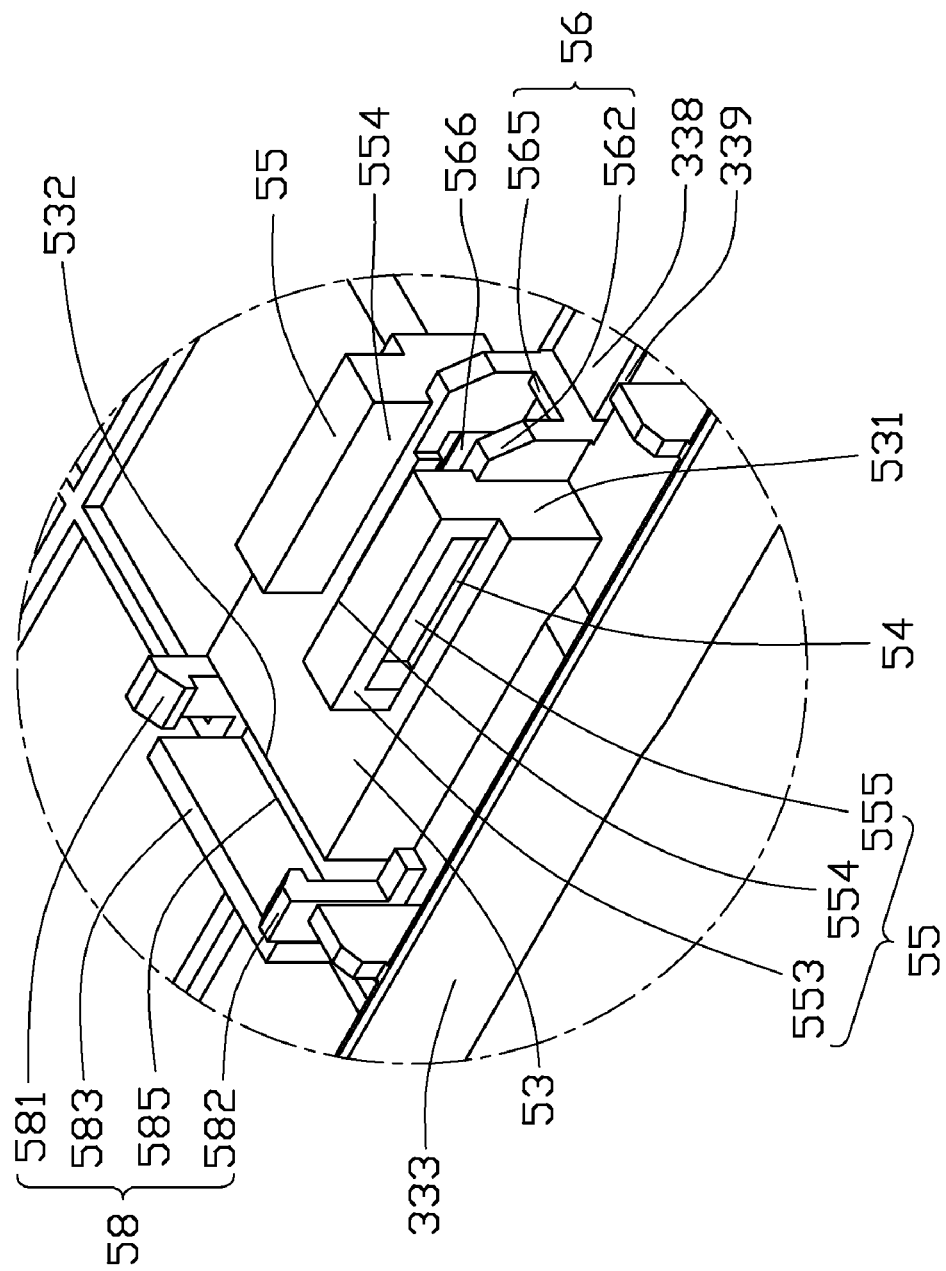
FIG. 4 is a partially enlarged view in the IV area of FIG. 2.

Referring also to FIG. 4, the securing portions 50 intersects the inner surface 331 and the outer surface 332 of the base 33. Each securing portion 50 defines a latching groove 52 at the side of the outer surface 332, and forms a latching block 53 at the side of the inner surface 53. Each latching groove 52 is substantially rectangular. The latching block 53 includes a first end 531, and a second end 532. The latching block 53 defines two slots 54 adjacent to the first end 531. The slots 54 communicate with the latching groove 52 at the opposite side thereof.

The latching block 53 forms two knobs 55, each of which respectively corresponded to a given slot 54. Each knob 54 includes a front wall 553 and a back wall 554. The front wall 553 defines a notch 555, which communicates with a corresponding slot 54. Each back wall 554 of the knobs 54 is opposite to each other.

A guiding portion 56 is formed at a middle area of the first end 531 of the latching block 53. The guiding portion 56 includes two extending walls 562 and a stopper block 565. The two extending walls 562 extend from the inner surface 331 to the first end 531 of the latching block 53. The two extending walls 562 are opposite to each other. The stopper block 565 is connected to one side of the extending walls 562. A height of the stopper block 565 is lower than that of the extending walls 562. The extending walls 562 with the stopper block 565 cooperatively define a space 566. The space 566 communicates with the latching groove 52.

A latching portion 58 is adjacent to the second end 532 of the latching block 53. The latching portion 58 includes two spaced apart hooks 581, 582 and a board 583. Each hook 581, 582 has an elastic distal end formed thereof. The board 583 is on one side of the two hooks 581, 582, and is parallel to the second end 532 of the latching block 53.

The outer surface 332 of the base 33 respectively defines a cutout 339 and a released portion 338 adjacent to a corresponding securing portion 50. Each released portion 338 extends from the base 33 into the cutout 339. The released portion 338 is spaced apart from the cutout 339. A distal end of the released portion 338 is toward the securing portion 50. Each released portion 338 has some elasticity. When the released portion 338 is pressed downward, the released portion 338 may return to an original state under the removal of the outer force.

Each orientation block 36 may, respectively, be assembled into a corresponding mounting portion 40. The orientation block 36 includes a main body 361 and a deformed portion 363. The deformed portion 363 is integrally formed with the main body 361. The main body 361 has an engaging surface 368 configured for being received in the receiving groove 42 so as to fix the orientation block 36 to the mounting portion 40. The deformed portion 363 is substantially arcuate, and has a first arcuate surface 367. In this illustrated embodiment, the deformed portion 363 is made of flexible material such as rubber. The main body 361 may be made of hard material such as Acrylonitrile Butadiene Styrene (ABS). The ABS material is one kind of plastics. The deformed portion 363 with the main body 361 is formed with double molding. Two clasps 365 perpendicularly extends from the engaging surface 368 of the main body 361. Each clasp 365 may be inserted into a corresponding hole 45 of the protrusion block 43.

Each located block 37 is configured for being fixed to the securing portion 50. The located block 37 includes a body 371 and a top portion 373. The body 371 has a bottom surface 378. The size and the shape of the bottom surface 378 corresponds to those of the latching groove 52, the bottom surface 378 is configured for being received in the latching groove 52. The top portion 373 is integrally formed with the body 371. In this illustrated embodiment, the top portion 373 is made of flexible material such as rubber. The body 371 may be made of hard material such as ABS. The top portion 373 with the body 371 is formed with double molding. The top portion 373 is substantially arcuate, and includes a second arcuate surface 377. The bottom surface 378 defines an aperture 374. Two hooks 375 extend from the bottom surface 378 at two sides of the aperture 374. The two hooks 375 may, respectively, be received in a corresponding slot 54 of the securing portion 50. A guiding catch 376 extends from one sidewall of the body 371 to the hooks 375. The guiding catch 376 may be received in the space 566 of the guiding portion 56, and is locked in the stopper block 565. At the same time, the guiding catch 376 resists a distal end of the released portion 338.

The first set magnets 38 and the second set magnets 39 are substantially rectangular cuboids. The second set magnets 38 may be respectively received between the board 583 of the latching portion 58 and the first end 532 of the latching block 53. The second set magnets 39 may be respectively received in a corresponding aperture 374 of the located block 37.

Figure 5:
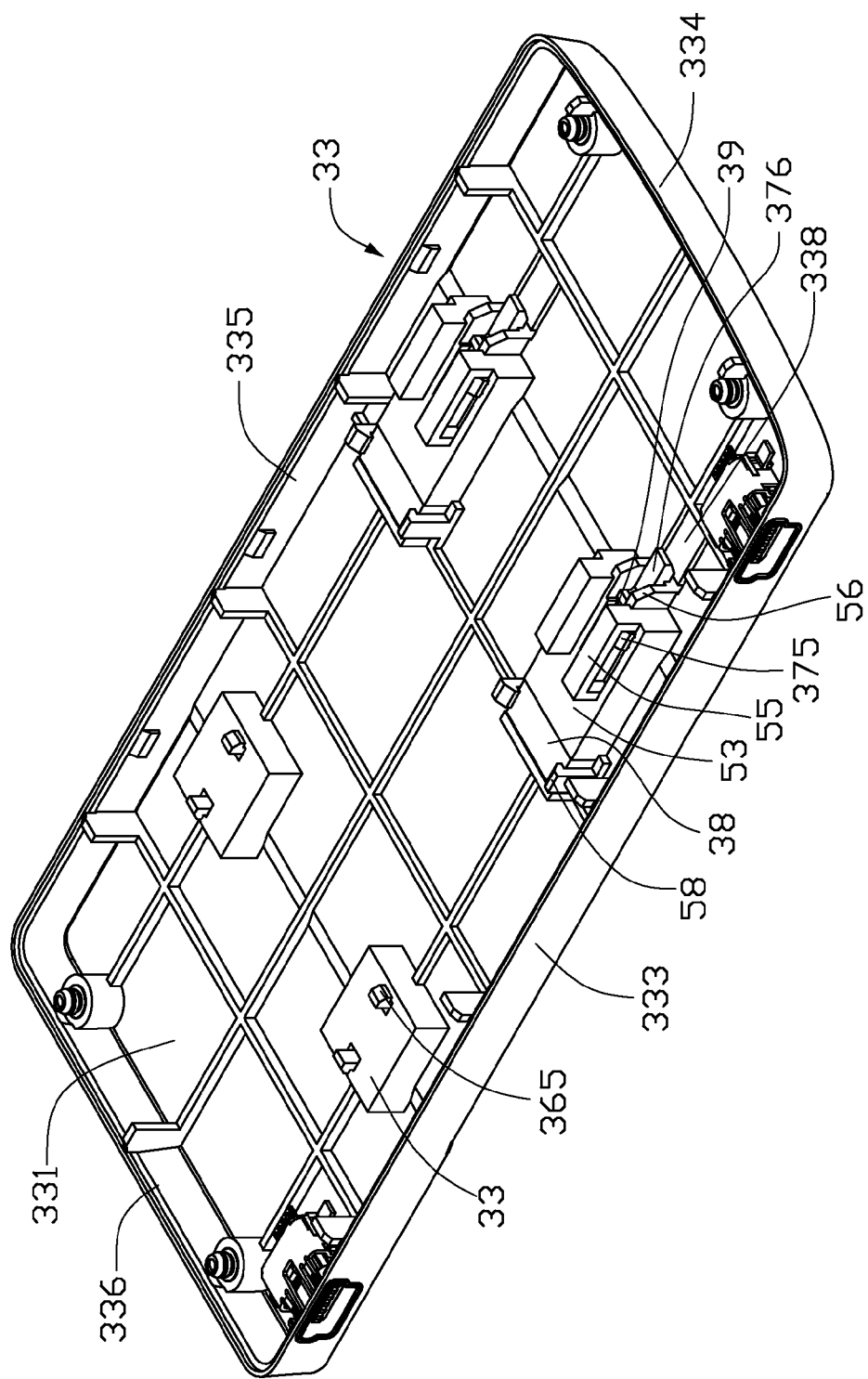
FIG. 5 is a partially assembled view of the base with the holder.
Figure 6:
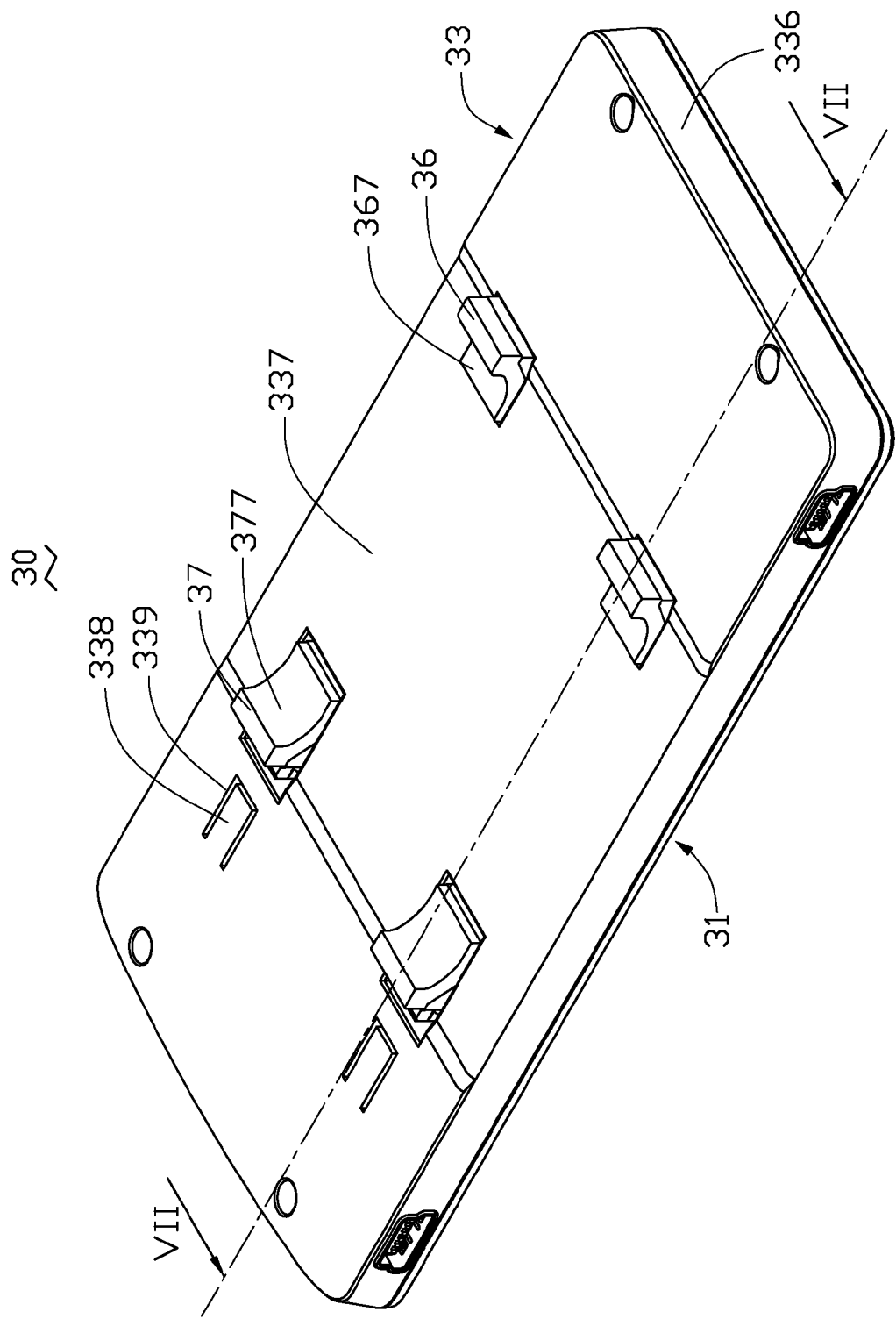
FIG. 6 is an assembled view of the external keypad with the holder.
Figure 7:
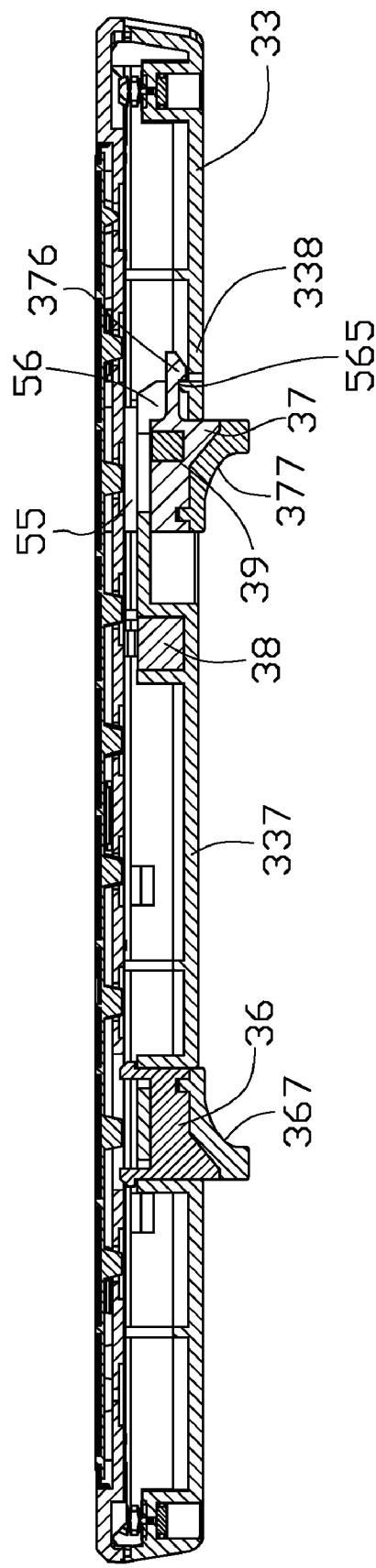
FIG. 7 is a cross-sectional view of FIG. 6.

In assembly, referring to FIGS. 5 to 7, the first magnets 38 are respectively fixed between the board 583 of the latching portion 58 and the first end 532 of the latching block 53. Then, the second magnets 39 are respectively fixed into a corresponding aperture 374 of the located block 37. The south magnetic poles of the first set magnets 38 are disposed facing the north magnetic poles of the second magnets 39 or vice versa.

Next, the main body 361 of each orientation block 36 is received in a given receiving groove 42 of the mounting portion 40. The clasps 365 of the orientation block 36 are respectively inserted into a given hole 45, and are exposed above the protrusion block 43. The located block 37 is received in the latching groove 52 of the securing portion 50. The hooks 375 of the located block 37 are respectively inserted into a given slot 54. The hooks 375 are locked in the notch 555 of the knobs 55. The guiding catch 376 extend from the space 566, and resists the released portion 338. Finally, the key module 31 is assembled into the base 33, thereby finishing the assembled process.

Figure 8:
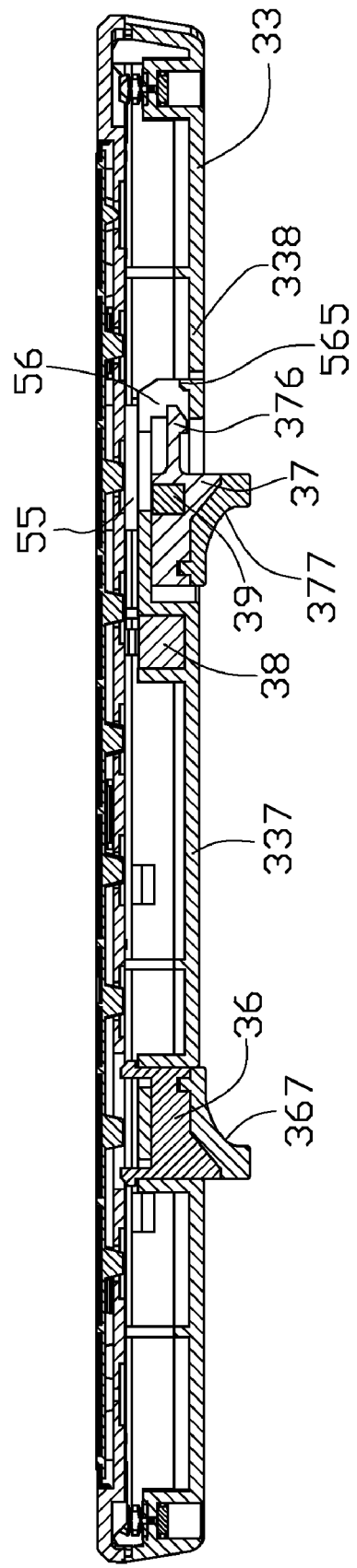
FIG. 8 is a cross-sectional view of FIG. 6 showing another state.

In use, the external keypad 30 is placed on the mobile phone 20 so that the body 22 of the mobile phone 20 is received in the recessed portion 337 of the base 33. The orientation blocks 36 and the located blocks 37 are disposed at two sides of the body 22 of the mobile phone 20. Then, the released portions 338 are pressed. Referring to FIG. 8, the free ends of the released portions 338 pushes the guiding catches 376 so that the guiding catches 376 are unlocked from the stopper blocks 565. Because the magnetic forces of the first set magnets 38, in the located blocks 37, are attracted to the magnetic forces of the second set magnets 39, the located blocks 37 slides in the notches 555 toward the orientation block 36. Accordingly, the distance between the orientation blocks 36 and the located blocks 36 may be adjusted until the first arcuate surface 367 and the second arcuate surface 377 securely clamps the two sides of the body 22 of the mobile phone 20. Since the first arcuate surface 367 and the second arcuate surface 377 are made of flexible material, the orientation block 36 and the located block 37 may provide full frictional force to clamp the mobile phone 20.

A main advantage of the present holder is that the orientation block 36 and the located block 37 of the holder 35 clamps the two sides of the mobile phone 20. The positions of the located blocks 37 are adjusted by the magnet force between the first set magnets 38 and the second set magnets 39. Therefore, the orientation blocks 36 and the located blocks 37 securely clamp the body 22 of the mobile phone 20. When the external keypad 30 is operated, the user may input information in both hands so as to control the mobile phone 20, thereby greatly improving the text-message input speed. In addition, the holder prevents the external keypad 30 separating from the mobile phone 20.

In an alternative embodiment, the number of the mounting portion 30, the securing portion 50, the orientation block 36 and the located block 37 may be one.

As described above, the present invention provides the holder for use with various portable devices, beyond the mobile phone illustrated, and/or with other devices requiring holder.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A holder, comprising:
   a base, the base comprising a mounting portion and a securing portion;
   an orientation block, the orientation block being fixed in the mounting portion;
   a located block, the located block being slidably engaged in the securing portion; and
   two magnets, one of the two magnets disposed adjacent to the securing portion, the other magnet disposed in the located block, the two magnets being attracted to each other and configured for adjusting a distance between the orientation block and the located block.

2. The holder as claimed in claim 1, wherein the mounting portion defines a receiving groove at one side of the base, and forms a protrusion block at an opposite side of the base, and the orientation block is received in the receiving groove.

3. The holder as claimed in claim 2, wherein the protrusion block has two symmetrical holes defined therein, each hole communicates with the receiving groove, and the orientation block has two clasps configured for being received in the holes.

4. The holder as claimed in claim 1, wherein the securing portion defines a latching groove on one side of the base, and forms a latching block at an opposite side of the base, and the located block is received in the latching groove.

5. The holder as claimed in claim 4, wherein the latching block includes a first end and a second end, the latching block defines two slots adjacent to the first end, and the slots communicates with the latching groove.

6. The holder as claimed in claim 5, wherein the latching block forms two knobs, each of which corresponds, respectively, to a given slot, each knob includes a front wall and a back wall, the front wall defines a notch communicating with a corresponding slot, and the located block has two hooks, which are received in the slots of the latching blocks and slides in the notches.

7. The holder as claimed in claim 5, wherein the latching block forms a guiding portion at a middle area of the first end thereof, the guiding portion includes two extending walls and a stopper block, and the stopper block is connected to one side of the extending walls.

8. The holder as claimed in claim 7, wherein a height of the stopper block is lower than that of the extending walls, the extending walls with the stopper block cooperatively define a space, the space communicates with the latching groove, the located block has a guiding catch, the guiding catch being received in the space of the guiding portion, and being locked in the stopper block.

9. The holder as claimed in claim 8, wherein the base respectively defines a cutout and a released portion adjacent to a corresponding securing portion, each released portion extends from the base into the cutout, and the guiding catch is configured for resisting the released portion.

10. The holder as claimed in claim 5, wherein the base has a latching portion disposed adjacent to the second end of the latching block, the latching portion includes two spaced hooks and a board, the board is disposed at one side of the two hooks, and one of the two magnets is disposed between the board and the latching block.

11. The holder as claimed in claim 10, wherein the located block defines an aperture at a bottom surface thereof configured for receiving the other of the two magnets.

12. The holder as claimed in claim 1, wherein the orientation block includes a main body and a deformed portion, the deformed portion has the first arcuate surface, the located block includes a body and a top portion, and the top portion has the second arcuate surface.

13. The holder as claimed in claim 12, wherein the top portion and the deformed portion are made of flexible material, and the body and the main body are made of hard material.

14. A holder for joining an external keypad to a portable electronic device, the holder comprising:
    a base, the base disposing two mounting portions and two securing portions, each mounting portion facing with a corresponding securing portion;
    two orientation blocks, each orientation block being fixed in a corresponding mounting portion;
    two located blocks, each securing portion being slidably engaged in the securing portion; and
    two sets of magnets with each set comprising two magnets, one set of the magnets disposed adjacent to the securing portion, the other set of the magnets disposed in the located block, the magnets, in each set, being attracted each other and configured for adjusting a distance between the orientation block and the located block.

15. The holder as claimed in claim 14, wherein each orientation block includes a main body and a deformed portion, the deformed portion is integrally formed with the main body by double molding, each located block includes a body and a top portion, and the body is integrally formed with the top portion by double molding.

16. The holder as claimed in claim 14, wherein each mounting portion defines a receiving groove at one side of the base, and forms a protrusion block at an opposite side of the base, the protrusion block has two symmetrical holes defined therein, each hole communicating with the receiving groove, and each orientation block has two clasps configured for being received in the holes.

17. The holder as claimed in claim 14, wherein each securing portion defines a latching groove at one side of the base, and forms a latching block at an opposite side of the base, the latching block defines two slots communicating with the latching groove, the latching block forms two knobs, each knob includes a front wall and a back wall, the front wall defines a notch communicating with a corresponding slot, and each located block has two hooks, which are received in the slots of the latching blocks and slide in the notches.

18. The holder as claimed in claim 17, wherein the latching block forms a guiding portion at a middle area of the first end thereof, the guiding portion includes two extending walls and a stopper block, the stopper block is connected to one side of the extending walls, the located block has a guiding catch, which received in the space of the guiding portion, and is locked in the stopper block.

19. The holder as claimed in claim 18, wherein the base respectively defines a cutout and a released portion adjacent to a corresponding securing portion, each released portion extends from the base into the cutout, and the guiding catch being configured for resisting the released portion.

20. The holder as claimed in claim 19, wherein the base has a latching portion opposite to the guiding portion, the latching portion includes two spaced hooks and a board, the board is disposed at one side of the two hooks, and one set of the magnets is disposed between the board and the latching block, the located block defines an aperture configured for receiving the other set of the magnets.

* * * * *